US006042744A

United States Patent [19]

Nation et al.

[11] Patent Number: 6,042,744

[45] Date of Patent: Mar. 28, 2000

[54] BLEACHING COMPOSITIONS COMPRISING HYPOCHLORITE AND DELIVERY SYSTEMS THEREFOR

[75] Inventors: Jayne Elisabeth Nation; Katherine Mary Thompson; David William Thornthwaite, all of Wirral, United Kingdom

[73] Assignee: Lever Brothers Company, division of Conopco, Inc., New York, N.Y.

[21] Appl. No.: 09/059,060

[22] Filed: Apr. 13, 1998

[30] Foreign Application Priority Data

Apr. 16, 1997 [GB] United Kingdom .................. 9707719

[51] Int. Cl.$^7$ .............................. A01N 3/00; A62D 3/00; C11D 3/00; C11D 7/18; C11D 9/42

[52] U.S. Cl. ............................... 252/187.23; 252/187.24; 510/370; 510/379; 510/380

[58] Field of Search ......................... 252/187.23, 187.24; 510/370, 379, 380

[56] References Cited

U.S. PATENT DOCUMENTS

| | | | |
|---|---|---|---|
| 3,607,161 | 9/1971 | Monick | 51/307 |
| 3,990,983 | 11/1976 | Lamberti | 510/379 |
| 4,249,274 | 2/1981 | Kikto | 4/227.6 |
| 4,606,775 | 8/1986 | Robinson et al. | 134/18 |
| 4,618,444 | 10/1986 | Hudson et al. | 8/111 |
| 5,344,838 | 9/1994 | Wachman et al. | 514/247 |
| 5,360,568 | 11/1994 | Madison et al. . | |
| 5,360,569 | 11/1994 | Madison et al. . | |
| 5,370,826 | 12/1994 | Madison et al. . | |
| 5,482,515 | 1/1996 | Madison et al. | 8/111 |
| 5,550,256 | 8/1996 | Madison et al. | 548/473 |
| 5,599,781 | 2/1997 | Haeggberg et al. | 510/220 |
| 5,853,430 | 12/1998 | Shindo et al. | 8/137 |

*Primary Examiner*—Gabrielle Brouillette
*Assistant Examiner*—LaToya Cross
*Attorney, Agent, or Firm*—Milton L. Honig

[57] ABSTRACT

The invention provides a bleaching composition of pH 8–14 which comprises an oxygen transfer agent and hypochlorite or a source thereof and a method for bleaching a stained substrate which comprises the step of treating the substrate with a bleaching composition of pH 8–14 which bleaching composition comprises an oxygen transfer agent and hypochlorite or a source thereof. Particularly preferred oxygen transfer agents are imine quaternary ammonium salts such as N-methyl-3,4-dihydroisoquinolinium salts. Where these salts are used, suitable counter-ions include halides, sulphate, methosulphate, sulphonate, p-toluene sulphonate and phosphate. Oxygen transfer agents which comprise a quaternary nitrogen atom are preferred. In the alternative, the oxygen transfer agent can be a sulphonimine.

5 Claims, No Drawings

BLEACHING COMPOSITIONS COMPRISING HYPOCHLORITE AND DELIVERY SYSTEMS THEREFOR

FIELD OF THE INVENTION

The present invention relates to hypochlorite bleaching compositions.

BACKGROUND TO THE INVENTION

In household cleaning, fabric washing and in many other areas there is a general need for agents which can 'bleach' unsightly materials. Agents which 'bleach ' normally can react with the unsightly materials to decolorize them. One of the most common of such bleaching agents is sodium hypochlorite, which is widely used in cleaning compositions to decolorize soils, to assist in cleaning through its reaction with soils and to kill micro-organisms.

Sodium hypochlorite is a powerful oxidising agent, which can decolorize a very large number of colored compounds found in soils but which has significant limitations when used to bleach certain fatty and pyrolised soils. There is a need to provide bleaching compositions which can attack these soils. There is also a need to reduce the usage of hypochlorite.

It is known to use oxygen transfer agents such as 'imine quat' compounds to promote the bleaching activity of peroxygen compounds. In the context of the present invention, an oxygen transfer agent is a species which reacts with a peroxygen compound such as hydrogen peroxide to form an oxidative bleaching species which oxidative bleaching species, subsequently reacts with a substrate to regenerate the oxygen transfer agent. Such oxygen transfer agents include N-methyl-3,4-dihydroisoquinolinium salts.

U.S. Pat. No. 5,360,569 discloses that imine quat molecules can be used to promote the activity of TAED/perborate bleaching compositions. These systems are believed to work by generating per-acetic acid in situ. This organic peroxide is believed to interact with the imine quat. to bring about the bleaching activity. U.S. Pat. No. 5,360,568 discloses that imine quat molecules can be used to promote the activity of monopersulphate (an inorganic peroxygen compound) and peroxy-adipyl-phthalimide (PAP) (an the organic peracid).

BRIEF DESCRIPTION OF THE INVENTION

We have now determined that imine quat compounds can significantly boost the bleaching effect of hypochlorite.

Accordingly, the present invention provides a bleaching composition of pH 8–14 which comprises an oxygen transfer agent and hypochlorite or a source thereof.

A further aspect of the present invention provides a method for bleaching a stained substrate which comprises the step of treating the substrate with a bleaching composition of pH 8–14 which bleaching composition comprises an oxygen transfer agent and hypochlorite or a source thereof.

A further aspect of the present invention comprises a delivery system comprising a first reservoir for liquid and a second reservoir for liquid, and means to dispense at least a part of the content of each said reservoir to a common point, wherein the first said reservoir for liquid contains a hypochlorite or source thereof and the second said reservoir for liquid contains an oxygen transfer agent.

DETAILED DESCRIPTION OF THE INVENTION

As noted above, hypochlorite, or at least a source of it, which may preferably be in the form of a so-called chlorine release agent is an essential component of the compositions according to the present invention. As hypochlorite is a reactive species, this will place some limitations on the other components which can be present. These are described in greater detail below.

Hypochlorite is preferably present at a level of 0.1–10% wt on product, more preferably 1–5% wt on product. In typical embodiments of the invention the weight ratio of the hypochlorite to the oxygen transfer agent falls in the range 5:1 to 20:1.

It is not necessary to use hypochlorite per se, as many compounds are available which react with water to liberate hypochlorite. Suitable water-soluble, chlorine release agents useful in accordance with the invention include chlorinated cyanurates, phthalimides, p-toluene sulphonamides, azodicarbonamides, hydantoins, glycoluracils, amines and melamines. A particularly preferred chlorine release agent for use in toilet blocks is sodium dichlorocyanurate (NaDCCA). When a chlorine release agent is used, the chlorine release agent is typically present in an amount of 10–30% and most preferably at around 25%. OXIDAN DCN/WSG™ available from Sigma Chemical is a dichlorocyanurate salt envisaged as a suitable bleaching agent.

Oxygen Transfer Agents

Oxygen transfer agents for use in the present invention, include, but are not limited to, the imine quat. N-methyl-3,4-dihydroisoquinolinium salts. Where these salts are used, suitable counter-ions include halides, sulphate, methosulphate, sulphonate, p-toluene sulphonate and phosphate. Oxygen transfer agents which comprise a quaternary nitrogen atom are preferred. In the alternative, the oxygen transfer agent can be a sulphonimine.

A broad class of oxygen transfer agents suitable for use in embodiments of the present invention are compounds comprising quaternary ions of the general structure:

$$(R_1)(R_2)C{=}N^+(R_3)(R_4)$$

Wherein:

- $R_1$ and $R_4$ are in a cis- relation and are substituted or unsubstituted moieties selected from the group consisting of hydrogen, phenyl, aryl, heterocyclic ring, alkyl and cycloalkyl radicles:
- $R_2$ is a substituted or unsubstituted moiety selected from the group consisting of hydrogen, phenyl, aryl, heterocyclic ring, alkyl, cycloalkyl, nitro, halo, cyano, alkoxy, keto, carboxylic acid and carboalkoxy groups:
- $R_3$ is a substituted or unsubstituted moiety selected from the group consisting of hydrogen, phenyl, aryl, heterocyclic ring, alkyl, cycloalkyl, nitro, halo and cyano groups:

Preferably, $R_1$ with $R_2$ and $R_3$ respectively together form a moiety selected from the group consisting of cycloalkyl, polycyclo, heterocyclic and aromatic ring systems.

Heterocyclic rings according to the present specification include cycloaliphatic and cycloaromatic type radicals incorporating an oxygen, sulphur and/or nitrogen atom within the ring system. Representative nitrogen heterocycles include pyridine, pyrrole, imidazole, triazole, tetrazole, morpholine, pyrrolidone, piperidene and piperazine. Suitable oxygen heterocycles include furan, tetrahydrofuran and dioxane. Sulphur heterocycles may include thiophene and tetrahydrothiophene.

The term substituted as used in relation to $R_1$, $R_2$, $R_3$ and $R_4$ includes a substituent which is nitro, halo, cyano, C1–C20 alkyl, amino, aminoalkyl, thioalkyl, sulphoalkyl, carboxyester, hydroxy, C1–C20 alkoxy, polyalkoxy, or C1–C40 quaternary di- or tri-alkyl ammonium.

Preferred oxygen transfer agents are quaternary imine salts, particularly those set forth in U.S. Pat. No. 5,360,568 (Madison and Coope), more particularly the substituted or unsubstituted isoquinolinium salts, preferably the 3,4 di-hydro isoquinolinium salts and more preferably the N-methyl 3,4 di-hydro-isoquinolinium salts. N-methyl-3,4-dihydro-6,7-dimethoxyisoquinolinium tosylate gives a performance benefit over that observed for hypochlorite. N-methyl 3,4 di-hydro-isoquinolinium p-toluene sulphonate is a particularly preferred oxygen transfer agent.

Typically, the oxygen transfer agents are present at levels of 0.001–10% wt on product. Preferably, the oxygen transfer agents are present at levels of 0.01–1% wt on product, more preferably 0.1–0.5% wt on product.

Surfactants

It is preferred that the compositions according to the invention further comprise one or more surfactant species. Surfactants can be nonionic, anionic, cationic, amphoteric or zwitterionic provided that they, and where appropriate their counter-ions, do not react substantially with the oxygen transfer agent or the hypochlorite.

Suitable nonionic detergent active compounds are alkoxylated alkanols. These can be broadly described as compounds produced by the condensation of alkylene oxide groups, which are hydrophilic in nature, with an organic hydrophobic compound which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

Particular examples include the condensation product of aliphatic alcohols having from 8 to 22 carbon atoms in either straight or branched chain configuration with ethylene oxide, such as a coconut oil ethylene oxide condensate having from 3 to 10 moles of ethylene oxide per mole of coconut alcohol; condensates of alkylphenols whose alkyl group contains from 6 to 12 carbon atoms with 3 to 10 moles of ethylene oxide per mole of alkylphenol.

The preferred alkoxylated alcohol nonionic surfactants are ethoxylated alcohols having a chain length of C9–C11 and an ethylene oxide (EO) value of at least 3 but less than 10. Particularly preferred nonionic surfactants include the condensation products of $C_{10}$ alcohols with 3–8 moles of ethylene oxide. The preferred ethoxylated alcohols have a calculated HLB of 10–16. An example of a suitable surfactant is 'IMBENTIN 91-35 OFA' (TM, ex. Kolb AG) a $C_{9-11}$ alcohol with five moles of ethoxylation.

Alternative surfactants include amine oxides, amines and/or ethoxylates thereof. Amine oxides with a carbon chain length of C8–C14 are particularly preferred.

Combinations of surfactants can be chosen to give appropriate thickening of the composition. Combinations of amine oxides and anionic surfactants, including fatty acids (soaps) and anionic hydrotropes, are known to thicken.

When present, the amount of nonionic detergent active to be employed in the composition of the invention will generally be from 0.01 to 30% wt, preferably from 0.1 to 20% wt, and most preferably from 3 to 10% wt for non-concentrated products. Concentrated products will have 10–20% wt nonionic surfactant present, whereas dilute products suitable for spraying will have 0.1–5% wt nonionic surfactant present.

pH

As noted above the pH of compositions according to the present invention falls in the range 8–14. pH of compositions is preferably 9–12, more preferably 10–11. At these higher pH's we have found that the composition penetrates more readily into the soils.

Minors

Minor components of compositions according to the present invention include those typically present in bleaching and/or cleaning compositions.

In compositions which contain hypochlorite it is useful to include a metal ion complexing agent to retard decomposition of the hypochlorite by any metal ions which may be present as contaminants or such as are introduced during processing. Again, these components should be selected such that they do not react substantially with the oxygen transfer agent or the hypochlorite.

Preferably, cleaning and/or disinfecting compositions according to the invention will further comprise at least 1% of a solvent of the form $R_1—O—(EO)_m—(PO)_n—R_2$, wherein $R_1$ and $R_2$ are independently C2–6 alkyl or H, but not both hydrogen, m and n are independently 0–5, EO is $CH_2CH_2O$ and PO is $CH(CH_3)CH_2O$. More preferably, the solvent is selected from the group comprising di-ethylene glycol mono n-butyl ether, mono-ethylene glycol mono n-butyl ether, propylene glycol n-butyl ether, isopropanol, ethanol, butanol and mixtures thereof. Typically, the level of solvent in cleaning and disinfecting compositions is 1–10%, with a solvent: nonionic ratio of 1:3–3:1 being particularly preferred.

Where compositions according to the present invention are liquids, they can be water-thin or thickened. Thickened compositions are advantageous in that they cling to sloping surfaces and find particular utility in toilet cleaners. Slight thickening of the composition is desirable for applications in which the composition is sprayed, so as to reduce the extent to which small droplets are produced which might otherwise cause respiratory irritation to the user. Suitable thickening agents include amine oxide and soap as mentioned above and systems based on nonionic surfactants.

Compositions according to the invention can also contain, in addition to the ingredients already mentioned, various other optional ingredients such as, colorants, optical brighteners, soil suspending agents, gel-control agents, freeze-thaw stabilizers, perfumes and opacifiers.

A particularly preferred compositions according to the present invention comprises a bleaching composition having a pH of 9–12, said composition being an aqueous liquid and comprising:

a) hypochlorite at a level of 0.1–10% wt on product,
b) 0.001–10% wt on product of an isoquinolinium salt,
c) 0.01 to 30% wt on product of at least one nonionic surfactant, and,
d) optional minors selected from the group consisting of solvents and perfumes.

Product Form

Products according to the present invention are generally liquids and preferably aqueous. However, other product forms including pastes and solids are also envisaged. As will be appreciated, the product form is largely determined by the end use and consequently liquids are generally suitable for use as hard surface cleaners, including cleaners for industrial, institutional and domestic cleaning and/or disinfection of hard surfaces including metal, plastics materials or other polymers, ceramic, and glass surfaces.

It is envisaged the method of the present invention can be applied in the cleaning of surfaces used for the preparation of food and beverages (representative surfaces being worktops, conveyor systems and utensils) or other industrial, institutional and domestic surfaces such as sanitary ware, industrial, institutional and domestic fluid supply applications, for disinfection of medical, surgical or dental apparatus, equipment, facilities or supplies, catheters, contact lens', surgical dressings or surgical instruments, in horticultural applications, e.g. for sterilizing the surfaces of greenhouses, for soft surfaces including fabrics (including in dressings, wipes and cloths), and non-living materials of biological origin (such as wood). Solid product forms are suitable for use as toilet and urinal, rim or cistern blocks and other uses where slow or delayed release of the components is required.

As noted above, a further aspect of the present invention comprises a delivery system comprising a first reservoir for liquid and a second reservoir for liquid, and means to dispense at least a part of the content of each said reservoir to a common point, wherein the first said reservoir for liquid contains a hypochlorite or source thereof and the second said reservoir for liquid contains an oxygen transfer agent.

The use of a such a multi-compartment packaging is preferred when the oxygen transfer agent is imine quat as hypochlorite and imine quat are not mutually stable and for long term storage. Consequently it is advantageous that the materials are delivered from a dual-compartment system with mixing occurring as, or shortly before, the product is applied to the surface. Mixing of the components produces a composition according to invention as described above.

In a typical preferred embodiment a sodium hypochlorite/Imine Quat system may be delivered from such a dual-compartment spray pack, by separating the components as follows:

Solution A: sodium hypochlorite (2% w/w), pH adjusted to 11.0.

Solution B: Imine Quat (2% w/w), pH adjusted to a figure in the range 5.0–6.0.

Solutions (A & B) are stable for >2 weeks and when dispensed from a suitable pack in equal proportions produce a hypochlorite/Imine Quat solution with a pH of 10.5. The bleaching efficacy of this solution, when appraised against the curcumin/oil model soil, is equal to that produced from a freshly prepared 'one-pot' reaction mixture.

The precise levels of alkali necessary to achieve the final desired pH on mixing will vary depending on the initial alkalinity of the sodium hypochlorite solution. It is preferred that suitable levels of surfactants, perfume etc are added to solutions of type B, but not to solutions of type A. The levels of these components will vary, depending on the mixing ratio of the solutions, so as to achieve the preferred levels of components in the final product as described above.

In order that the present invention may be further understood it will be described hereinafter by reference to illustrative and non-limiting examples and comparisons.

EXAMPLES

Example 1

The following examples were performed using model kitchen soils and a soiling procedure as described below. The soils were chosen to have recalcitrant stains, which would be difficult to bleach due to the hydrophobic or pyrolised nature of the stain.

Flat tiles, measuring 4"×4", are cut from white Formica sheeting and their surfaces thoroughly cleaned using a commercially available liquid abrasive cleaner such as 3IF®, a Unilever trademark. After rinsing with demineralized water, the tiles are allowed to dry at room temperature.

The curcumin/oil stain is prepared by mixing 19 g of vegetable oil and 180 g of ethanol and then adding 1 g of pure curcumin (a pigment found in curry powder). After thorough stirring, the resulting solution is sprayed onto the tiles using two different methods to give two different soiling characteristics. A first method used a spray gun driven by an airbrush propellent canister so as to give a uniform surface coverage. A second method used a compressor driven spray gun to give a higher soil loading that in the first method.

After either soiling method, the tiles are left to dry for a minimum of 10 minutes, during which time the ethanol evaporates leaving a bright yellow, slightly sticky, oily stain, which cannot be removed by wiping or rinsing with water. Curcumin is susceptible to photo-oxidation and stained tiles should not be stored for periods exceeding 2 hours before use.

In the examples described the oxygen transfer agent was N-methyl 3,4 di-hydro isoquinolinium p-toluene sulphonate. The preparation of this material is described in U.S. Pat. Nos. 5,360,569 and 5,360,568 which are incorporated herein by reference. The material is referred to below as the 'imine quat'.

Examples were performed at room temperature. A glass ring, of diameter 50 mm and height 15 mm, is placed over the centre of the stained tile and 5 $cm^3$ of the aqueous bleach or surfactant solution is pipetted within the annulus of the ring. The solution is allowed to remain in contact with the stained tile surface for 30 seconds, after which the glass ring is removed and the solution poured away. The tile is immediately rinsed with demineralized water for a further 30 seconds and then allowed to dry. Each solution is used to treat two tiles.

The extent of stain removal is assessed visually by a panel of at least 15 people, using a standard scale. Tiles are graded on an integer scale ranging from 0 to 5, where 0 denotes no visible soil removal and 5 corresponds to total removal. A minimum of two stained tiles are treated with each bleach solution and mean scores for each system are calculated by averaging the scores from both tiles.

Results for the airbrush soiling method are shown in TABLE 1 below. From the results presented in TABLE 1, it can be seen that a significant improvement as regards bleaching is obtained in the presence of the imine quat.

Comparing the results with conventional cleaning/bleaching systems. It can be seen that use of an oxygen transfer agent together with hypochlorite provides results which are very favorably comparable with hypochlorite alone.

TABLE 1

Curcumin-oil experiments:
Enhancement of Sodium Hypochlorite Bleaching by Imine Quat
(30 seconds contact time, pH 10.5, airbrush spray test)

| SYSTEM | Average Score* |
|---|---|
| a) 1.0% sodium hypochlorite without Imine Quat | 1.1 ± 0.5 |
| b) 1.0% sodium hypochlorite + 0.3% Imine Quat | 3.5 ± 0.5 |
| c) 1.0% sodium hypochlorite + 0.5% Imine Quat | 4.1 ± 0.3 |
| d) 1.0% sodium hypochlorite + 1.0% Imine Quat | 2.7 ± 0.5 |

*Scores are given with 95% confidence limits.

Results for the compressor-driven soiling method are shown in TABLE 2 below. From the results presented in TABLE 2, it can be seen that a significant improvement as regards bleaching is obtained in the presence of the imine quat.

Comparing the results with conventional cleaning/bleaching systems. It can be seen that use of an oxygen transfer agent together with hypochlorite provides results which are very favorably comparable with hypochlorite alone.

TABLE 2

Curcumin-oil experiments:
Enhancement of Sodium Hypochlorite Bleaching by Imine Quat
(30 seconds contact time, pH 10.5, compressor spray test)

| SYSTEM | Average Score* |
|---|---|
| a) 1.0% sodium hypochlorite without Imine Quat | 1.0 ± 0.3 |
| b) 1.0% sodium hypochlorite + 0.1% Imine Quat | 1.9 ± 0.3 |
| c) 1.0% sodium hypochlorite + 0.5% Imine Quat | 1.2 ± 0.3 |
| d) 1.0% sodium hypochlorite + 1.0% Imine Quat | 3.7 ± 0.3 |

*Scores are given with 95% confidence limits.

Example 2

The method of soil preparation is as described before, except that the soil is sprayed onto the Decamel surface using a air compressor. Systems are scored for soil removal as described previously.

All bleach solutions were adjusted to pH 10.5 and were left in contact with the soiled surface for 30 seconds. Imine Quat derivatives were examined at levels corresponding to the same molar concentration as Imine Quat (0.0315 mol $dm^{-3}$). Results are given in Table 3 below.

TABLE 3

| BLEACH SYSTEM | SCORE* |
|---|---|
| sodium hypochlorite (1% w/w) | 0.7 ± 0.2 |
| sodium hypochlorite (1% w/w) & 1.0% w/w Imine Quat tosylate | 3.1 ± 0.2 |
| sodium hypochlorite (1% w/w) & 1.04% w/w 1-methyl-Imine Quat tosylate | 1.1 ± 0.2 |
| sodium hypochlorite (1% w/w) & 1.19% w/w 6, 7-dimethoxy-Imine Quat tosylate | 1.9 ± 0.2 |

*mean score ± 95% confidence limits

Example 3

As sodium hypochlorite and Imine Quat are not mutually stable for long term storage it is preferable that they are delivered from a dual-compartment system with mixing occurring as the product is applied to the surface.

The sodium hypochlorite (1% w/w)/Imine Quat (1% w/w) system were delivered from a dual-compartment spray pack, by separating the components as follows:

Solution A: sodium hypochlorite (2% w/w), pH adjusted to 11.0.

Solution B: Imine Quat (2% w/w), pH adjusted to a figure in the range 5.0–6.0.

Solutions (A & B) were found to be stable for >2 weeks and when dispensed from a suitable pack produce a hypochlorite/Imine Quat solution with a pH of 10.5. The bleaching efficacy of this solution, when appraised against the curcumin/oil model soil, is equal to that produced from a freshly prepared ‘one-pot’ reaction mixture.

We claim:

1. A bleaching composition of pH 8–14 comprising an oxygen transfer agent and hypochlorite or a source thereof, the oxygen transfer agent being a substituted or unsubstituted dihydroisoquinolinium salt.

2. A bleaching composition according to claim 1 wherein hypochlorite is present at a level of 0.5–10% wt of the composition.

3. A bleaching composition according to claim 1 wherein the weight ratio of the hypochlorite to the oxygen transfer agent falls in the range 5:1 to 20:1.

4. A bleaching composition according to claim 1 having a pH of 9–12, said composition being an aqueous liquid and comprising:

(a) 0.1–10% wt based on the composition of hypochlorite or a source thereof, (b) 0.001–10% wt based on the composition of the dihydroisoquinolinium salt, (c) 0.01 to 30% wt based on the composition of at least one nonionic surfactant, and (d) optional minor ingredients selected from the group consisting of solvents and perfumes.

5. A method for beaching a stained substrate which comprises the step of treating the substrate with a bleaching composition as defined in claim 1 and rinsing the substrate with water.

* * * * *